(12) United States Patent
Marsh et al.

(10) Patent No.: US 11,826,973 B2
(45) Date of Patent: Nov. 28, 2023

(54) APPARATUSES AND METHODS FOR MULTISTAGE MOLDING OF LENSES

(71) Applicant: Innovega, Inc., Bellevue, WA (US)

(72) Inventors: Jay P. Marsh, Bonsall, CA (US); Jerome A. Legerton, Jupiter, FL (US)

(73) Assignee: Innovega, Inc., Bellevue, WA (US)

( * ) Notice: Subject to any disclaimer, the term of this patent is extended or adjusted under 35 U.S.C. 154(b) by 0 days.

(21) Appl. No.: 17/839,218

(22) Filed: Jun. 13, 2022

(65) Prior Publication Data

US 2022/0305746 A1    Sep. 29, 2022

Related U.S. Application Data

(63) Continuation of application No. 16/675,710, filed on Nov. 6, 2019, now Pat. No. 11,426,959.

(51) Int. Cl.
*B29D 11/00* (2006.01)
*G02C 7/04* (2006.01)
*G02B 1/04* (2006.01)

(52) U.S. Cl.
CPC ........ *B29D 11/00038* (2013.01); *G02C 7/047* (2013.01); *G02C 7/049* (2013.01); *G02B 1/043* (2013.01)

(58) Field of Classification Search
CPC ... B29D 11/00038; G02C 7/047; G02C 7/049
USPC .................................................. 351/159.02
See application file for complete search history.

(56) References Cited

U.S. PATENT DOCUMENTS

| 4,208,365 A * | 6/1980 | LeFevre ........... B29D 11/00528 425/808 |
| 5,806,169 A | 9/1998 | Trago et al. |
| 6,315,929 B1 | 11/2001 | Ishihara et al. |
| 8,003,024 B2 | 8/2011 | Yao et al. |
| 8,292,256 B2 | 10/2012 | Yin et al. |
| 8,507,577 B2 | 8/2013 | Zanini et al. |
| 2009/0108479 A1 | 4/2009 | Lai et al. |
| 2009/0230575 A1 | 9/2009 | Liu et al. |
| 2011/0089586 A1 * | 4/2011 | Biel ........................ B29C 43/02 425/150 |
| 2012/0105971 A1 | 5/2012 | Lee et al. |
| 2012/0139137 A1 | 6/2012 | Qiu |
| 2012/0139138 A1 | 6/2012 | Samuel et al. |

(Continued)

FOREIGN PATENT DOCUMENTS

| EP | 1368180 B1 | 7/2007 |
| EP | 2028528 A1 | 2/2009 |

(Continued)

OTHER PUBLICATIONS

International Search Report and Written Opinion in Application No. PCT/US2020/058919, dated Mar. 12, 2021.

*Primary Examiner* — James R Greece
(74) *Attorney, Agent, or Firm* — Sheppard Mullin Richter & Hampton LLP

(57) ABSTRACT

Apparatuses and methods for multistage molding of contact lenses containing low oxygen permeable components or oxygen impermeable components. Components may be embedded within a contact lens by forming a device on a polymer substrate, molding a spacer onto a male mold, bonding the device to the spacer, removing the polymer substrate, and molding the remainder of the contact lens.

13 Claims, 3 Drawing Sheets

(56) References Cited

U.S. PATENT DOCUMENTS

| | | |
|---|---|---|
| 2014/0155515 A1 | 6/2014 | Lai et al. |
| 2014/0360891 A1 | 12/2014 | Kline et al. |
| 2015/0291929 A1 | 10/2015 | Murphy et al. |
| 2016/0216534 A1 | 7/2016 | Legerton et al. |
| 2018/0136492 A1 | 5/2018 | An et al. |
| 2019/0217561 A1 | 7/2019 | Nakajima et al. |

FOREIGN PATENT DOCUMENTS

| | | |
|---|---|---|
| GB | 577467 A | 5/1946 |
| JP | 2012-37647 A | 2/2012 |
| JP | 2015-94825 A | 5/2015 |
| JP | 2017-061550 A1 | 3/2017 |
| WO | 2001/35157 A1 | 5/2001 |
| WO | 2005/031400 A2 | 4/2005 |
| WO | 2019-078231 A1 | 4/2019 |

\* cited by examiner

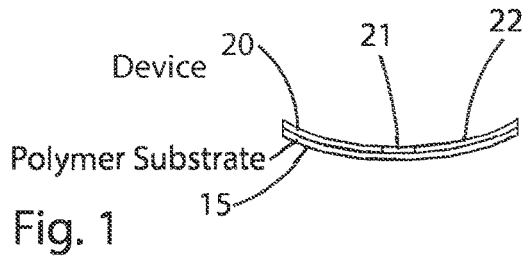

Fig. 1

1. Make Thermoformed and Trimmed Device (8.50 mm OD, 0.010 mm thick)

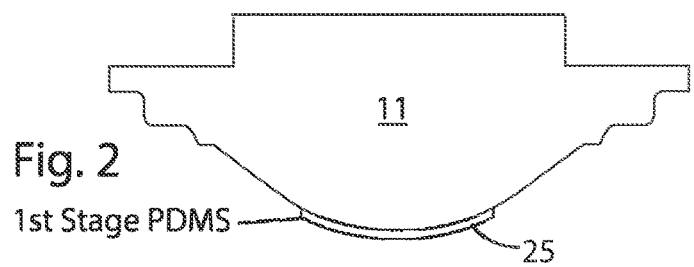

Fig. 2

2. Mold 300 um PDMS Spacer onto Male Mold in 1st Stage Molding Operation (8.30 mm OD, Insert #1)

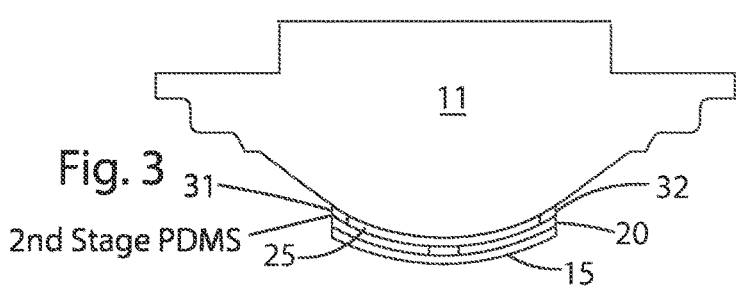

Fig. 3

3. Bond Device to Spacer in 2nd Stage Molding Operation (8.50 mm OD Device, 8.30 mm OD spacer, insert #2 with cavity thickness 330 um)

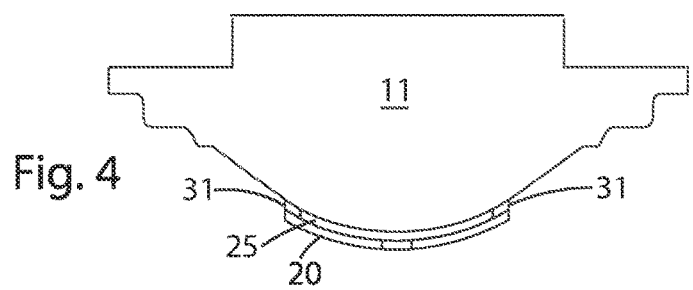

Fig. 4

4. Remove Polymer Substrate from Device leaving 8.50 mm OD Device on 8.50 mm spacer (310 um total thickness after polymer removal)

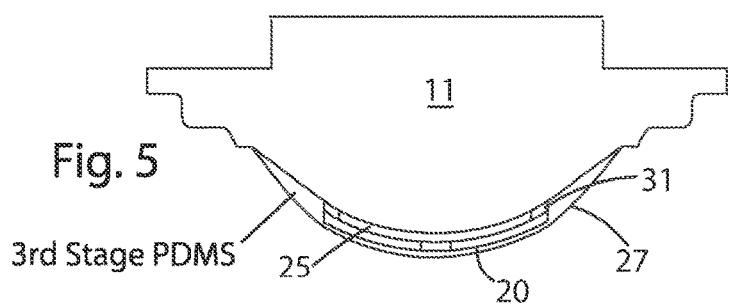

Fig. 5

5. Mold PDMS to complete a Lens in 3rd Stage Molding Operation (Female Lens Mold, 400 um center thickness)

APPARATUSES AND METHODS FOR MULTISTAGE MOLDING OF LENSES

REFERENCE TO RELATED APPLICATIONS

The present application is a continuation of U.S. patent application Ser. No. 16/675,710, filed Nov. 6, 2019, the contents of which are incorporated by reference herein in their entirety.

TECHNICAL FIELD

This invention relates to the general field of optical lenses, and more specifically toward apparatuses and methods for multistage molding of contact lenses. Components may be embedded within a contact lens by forming a device on a polymer substrate, molding a spacer onto a male mold, bonding the device to the spacer, removing the polymer substrate, and molding the remainder of the contact lens.

BACKGROUND

The earliest reference to eyeborne optics is credited to Leonardo DaVinci for his envisioning of the value of placing optics on the eye. The first application was with glass scleral shells nearly 400 years later. The advent of plastics, particularly polymethylmethacrylate (PMMA) launched the era of corneal contact lenses wherein the material made contact with the cornea only. PMMA was characterized as having no gas permeability. Lenses required designs that allowed for fluid exchange behind the lens for oxygen delivery to the cornea. The decade of the 1970's became a period of development of gas permeable rigid polymers for corneal contact lenses. Lens designs were modified to a closer lens-eye relationship with resultant improvement of lens comfort. The modal amount of clearance and movement for non-gas permeable lenses could be decreased as the gas permeability of materials and the resultant oxygen transmissibility increased.

The wearing of contact lenses can cause physiological and even pathological ocular changes to occur. These changes involve both ocular structure and function, and hypoxia has been implicated in their etiologies. Normal corneal metabolism and physiological function are maintained only with an adequate supply of oxygen. Contact lens parameters are important in determining the oxygen tension between the cornea and the contact lens and whether or not the cornea is being supplied adequate amounts of oxygen during the wearing of these lenses. While wearing a rigid contact lens, there are two ways in which oxygen can be delivered to the cornea: transmission through the lens material itself or through the pumping of tears (bulk-flow volume exchange and stirring) beneath the contact lens during blinking. Rigid contact lenses can be manufactured in a variety of designs to achieve appropriate centration, movement, and tear exchange.

The use of ultra-high oxygen permeable materials presents a paradoxical opportunity to increase thickness of a layer beneath a low or non-gas permeable component to increase the equivalent oxygen percentage to the surface of the cornea covered by the component. Conventional practice as aforementioned constructs lenses thinner to increase oxygen transmissibility since the formula for transmissibility is the permeability divided by the thickness. If this practice were applied to a layer posterior to a low or non-gas permeable component, the oxygen percentage beneath the component would decrease. Nine percent (9%) is established as the minimum for open eye or daily wearing for particular embodiments of the present invention.

There are references that disclose layered lens constructions that include a cavity or chamber for retaining a component, a fluid or a gel. The oxygen permeability of the previously taught aqueous solutions is substantially lower than that of the polymers intended for the embodiments of the present disclosure. While some of the prior art references have merit for delivering oxygen, the complexity of fabricating lenses described by the art is far more challenging. Biocompatibility and management of the integrity of the aqueous or gel filled cavities is also troublesome.

Reports of the inclusion of elements or components into contact lenses have been made in recent years. These elements include filters, light emitting diodes (LED), light sources, sensors, strain gauges, processors, sending units, wires and batteries. The reports include the use of graphene for night vision display applications. In many cases, like the use of graphene, titanium pin-hole apertures, low gas permeable polarizer filters, LED and organic LED (OLED) arrays, and dielectric stack filters, the respective elements or components are not gas permeable or demonstrate low permeability. Thus, there has existed a need for apparatuses and methods for incorporating the at least one element or component which has an oxygen permeability lower than the material of the lens body in a contact lens.

The current invention provides just such a solution with apparatuses and methods for multistage molding of contact lenses. Components may be embedded within a contact lens by forming a device with or without a polymer substrate, molding a lens substrate polymer spacer onto a male mold, bonding the device to the spacer, removing the device polymer substrate if present, and molding the remainder of the contact lens.

Elements are embedded within a contact lens using multiple stages of molding. Each stage incrementally builds up the lens to allow access for placement and position control of the embedded elements relative to the optical and mechanical axes, as well as relative to the front and back lens surfaces. This partial build up is performed by only creating a portion of the base curve surface in the first and second stages. In certain embodiments, these stages do not extend beyond the optic zone. In other embodiments, these initial stages are focused on the optic zone, but may also extend beyond the optic zone. The first stage is created to define the base curve offset distance and allows for the embedded item to be molded onto this stage during the second stage of molding. This second stage partially or fully encapsulates the first stage, including the zone on the base curve surface of the lens. One or more additional stages are used to fully encapsulate the former stages and complete the finished lens. This process is not limited to three or more stages, but could be expanded or reduced to any number of stages, but at least two stages.

The lens material used in each stage is selected such that interface bonding is achieved. Particular embodiments provide for a lens material used in each stage that is highly similar if not identical. The elements embedded in the lens may vary in size and shape, but must be small enough to be encapsulated in their integration stage and in the final lens. Mechanical properties and oxygen permeability of the embedded materials may also vary greatly, including both rigid and flexible components that have high, low, or even no oxygen permeability.

It is an object of the current disclosure to provide an apparatus or apparatuses for multistage molding of contact lenses that include one or more embedded components.

It is another object of the current disclosure to provide a method for multistage molding of contact lenses that include one or more embedded components.

It is a further object of the current disclosure to provide a multistage process for embedding components within a contact lens using a polymer substrate.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. Furthermore, the use of plurals can also refer to the singular, including without limitation when a term refers to one or more of a particular item; likewise, the use of a singular term can also include the plural, unless the context dictates otherwise.

The presence of broadening words and phrases such as "one or more," "at least," "but not limited to" or other like phrases in some instances shall not be read to mean that the narrower case is intended or required in instances where such broadening phrases may be absent. Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

There has thus been outlined, rather broadly, the more important features of the invention in order that the detailed description thereof may be better understood, and in order that the present contribution to the art may be better appreciated. There are additional features of the invention that will be described hereinafter and which will also form the subject matter of the claims appended hereto. The features listed herein and other features, aspects and advantages of the present invention will become better understood with reference to the following description and appended claims.

As used herein, a lens material is a material that is appropriate for use as a part of a contact lens, including without limitation polydimethylsiloxane.

BRIEF DESCRIPTION OF THE DRAWINGS

The accompanying drawings, which are incorporated in and form a part of this specification, illustrate embodiments of the invention and together with the description, serve to explain the principles of this invention.

FIG. 1 is a cutaway side view of a component affixed to a polymer substrate according to selected embodiments of the current disclosure.

FIG. 2 is a cutaway side view of a male mold in a first stage of molding operation according to selected embodiments of the current disclosure.

FIG. 3 is a cutaway side view of a male mold in a second stage of molding operation according to selected embodiments of the current disclosure.

FIG. 4 is a cutaway side view of a male mold after the removal of a polymer substrate from an embedded device according to selected embodiments of the current disclosure.

FIG. 5 is a cutaway side view of a male mold in a final stage of molding operation according to selected embodiments of the current disclosure.

DETAILED DESCRIPTION OF THE DRAWINGS

Figure 6:
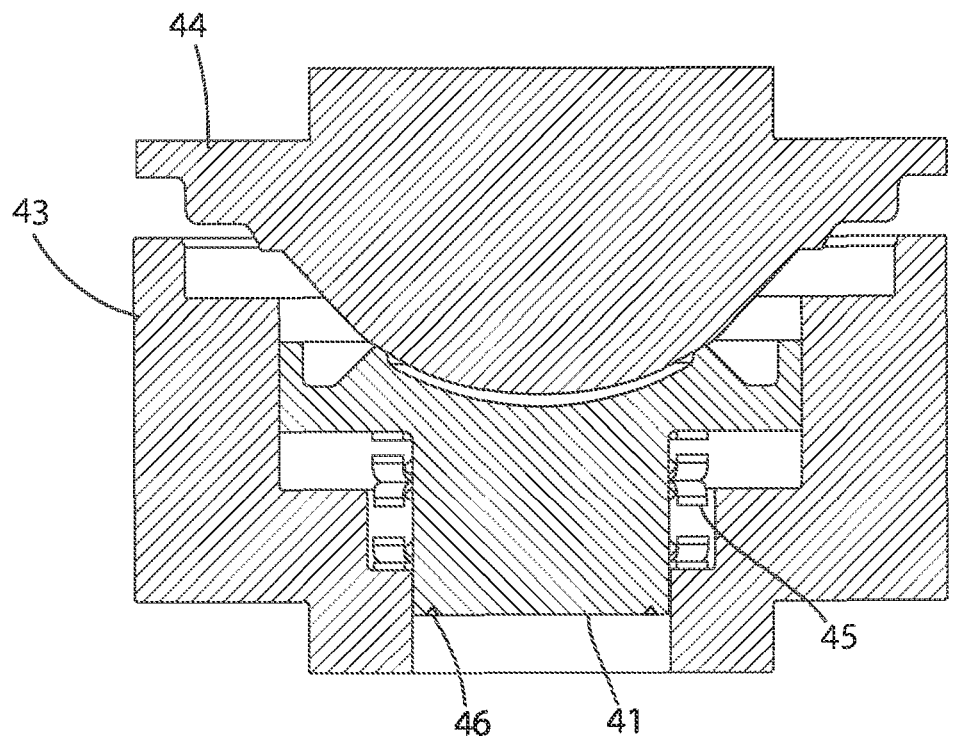
FIG. 6 is a cutaway side view of an apparatus for a first stage of multistage molding of a contact lens according to selected embodiments of the current disclosure.

Many aspects of the invention can be better understood with the references made to the drawings below. The components in the drawings are not necessarily drawn to scale. Instead, emphasis is placed upon clearly illustrating the components of the present invention. Moreover, like reference numerals designate corresponding parts through the several views in the drawings.

FIG. 1 is a cutaway side view of a component affixed to a polymer substrate according to selected embodiments of the current disclosure. The component 20 is affixed or otherwise temporarily secured to a polymer substrate. In particular embodiments, the component is thermoformed with the polymer substrate and trimmed to an outer diameter of 8.50 mm, where the component has a thickness of 0.15 μm and the polymer substrate has a thickness of 10 μm for a total thickness of 10.15 μm. The component may be made up of multiple portions or subcomponents, for example, such as an inner subcomponent 21 and an outer subcomponent 22.

FIG. 2 is a cutaway side view of a male mold after a first stage of molding operation according to selected embodiments of the current disclosure. A polydimethylsiloxane (PDMS) spacer 25 is molded onto a male mold 11. In certain embodiments the spacer 25 is 300 μm thick, with an outside diameter of 8.30 mm.

FIG. 3 is a cutaway side view of a male mold in a second stage of molding operation according to selected embodiments of the current disclosure. The component 20 (which is secured to the polymer substrate 15) is bonded to the spacer 25 during the second stage of the molding operation. Insert 31 is placed between the male mold 11 and component 20, and next to spacer 25. In certain embodiments, the outside diameter of the component is greater than the outside diameter of the spacer and equal to the inside diameter of Insert 31. The lens material fills the difference between the outside diameter of the component and the outside diameter of the spacer. Thereby, the outside diameter of the component is directly positioned by Insert 31. In other embodiments, the outside diameter of the component is equal to or less than the outside diameter of the spacer. The resulting object after the second stage of the molding operation, according to selected embodiments, has an outer diameter of 8.50 mm, with a thickness of 330 μm.

FIG. 4 is a cutaway side view of a male mold after the removal of a polymer substrate from an embedded device according to selected embodiments of the current disclosure. With the polymer substrate removed, there remains the component 20 bonded to the spacer 25 and insert 31. The outer diameter remains unchanged, but the thickness is reduced by the thickness of the polymer substrate. Thus, certain embodiments provide for a total thickness of 310 µm after the removal of the polymer substrate, which includes the spacer with a thickness of 300 µm, the component, and the bond line with a thickness of 10 µm.

FIG. 5 is a cutaway side view of a male mold after a final stage of molding operation according to selected embodiments of the current disclosure. Additional lens material 27 is molded around the component 20, spacer 25, and insert 31. The lens material 27 extends beyond the outer diameter of the component 20, spacer 25, and insert 31. A female mold may be used to form the outer surface of the lens material 27. Certain embodiments provide for a center lens thickness of 400 µm. Once the lens material is set, the resulting contact lens with embedded components may be removed from the mold.

FIG. 6 is a cutaway side view of an apparatus for a first stage of multistage molding of a contact lens according to selected embodiments of the current disclosure. A female mold insert 41 rests within a housing 43, supported by a compression spring 45. A male mold 44 mates with the female mold insert 41 that provides for a cavity with an 8.30 mm outer diameter, with a thickness of 300 µm. Grooves 46 in the bottom of the female mold insert 41 provide for identification of the type of female mold insert such that it is less easily confused with other similar size and shaped female mold inserts, such as the second female mold insert discussed below with reference to FIG. 7. This image depicts the components in a first assembled position prior to closure and clamping for polymerization of the spacer material.

Figure 7:
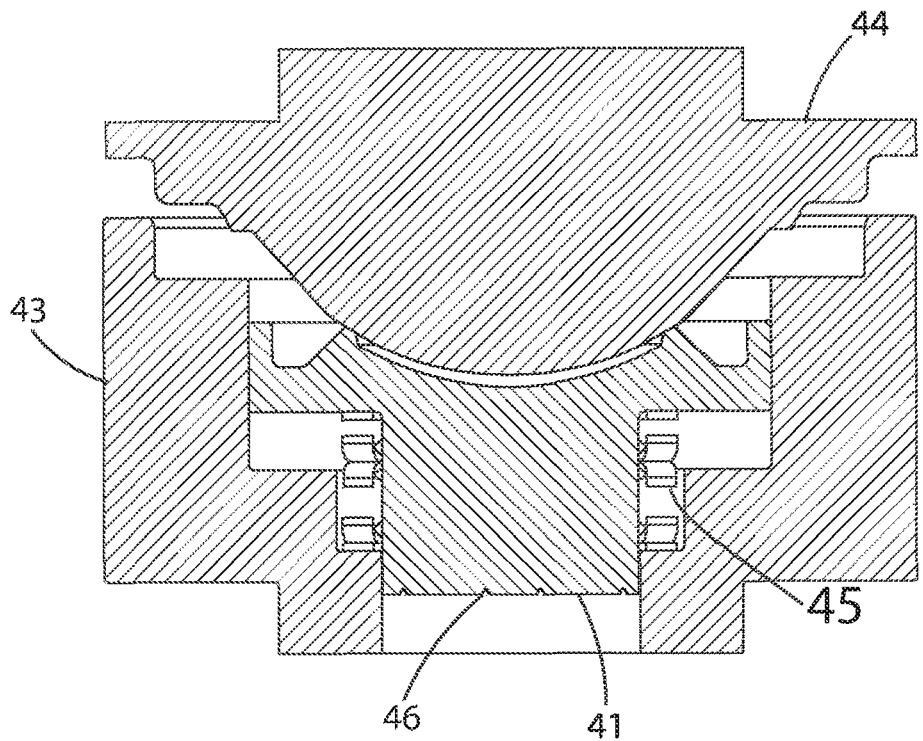
FIG. 7 is a cutaway side view of an apparatus for multistage molding for a subsequent stage of multistage molding of a contact lens according to selected embodiments of the current disclosure.

FIG. 7 is a cutaway side view of an apparatus for multistage molding for a subsequent stage of multistage molding of a contact lens according to selected embodiments of the current disclosure. A second female mold insert 42 rests within a housing 43, supported by a wave washer 45. A male mold 44 mates with the female mold insert 42 that provides for a cavity with an 8.50 mm outer diameter, with a thickness of 330 µm. Grooves 46 in the bottom of the female mold insert 42 provide for identification of the type of female mold insert such that it is less easily confused with other similar size and shaped female mold inserts, such as the female mold insert discussed above with reference to FIG. 6. This image depicts the components in a first assembled position prior to closure and clamping for polymerization of the spacer material.

Furthermore, while it may be possible to use the first female mold insert and second female mold insert with the same housing, it is nonetheless possible and in certain embodiments may be preferable to have two same or similar housings, one to house the first female mold insert and one to house the second female mold insert.

Figure 8:
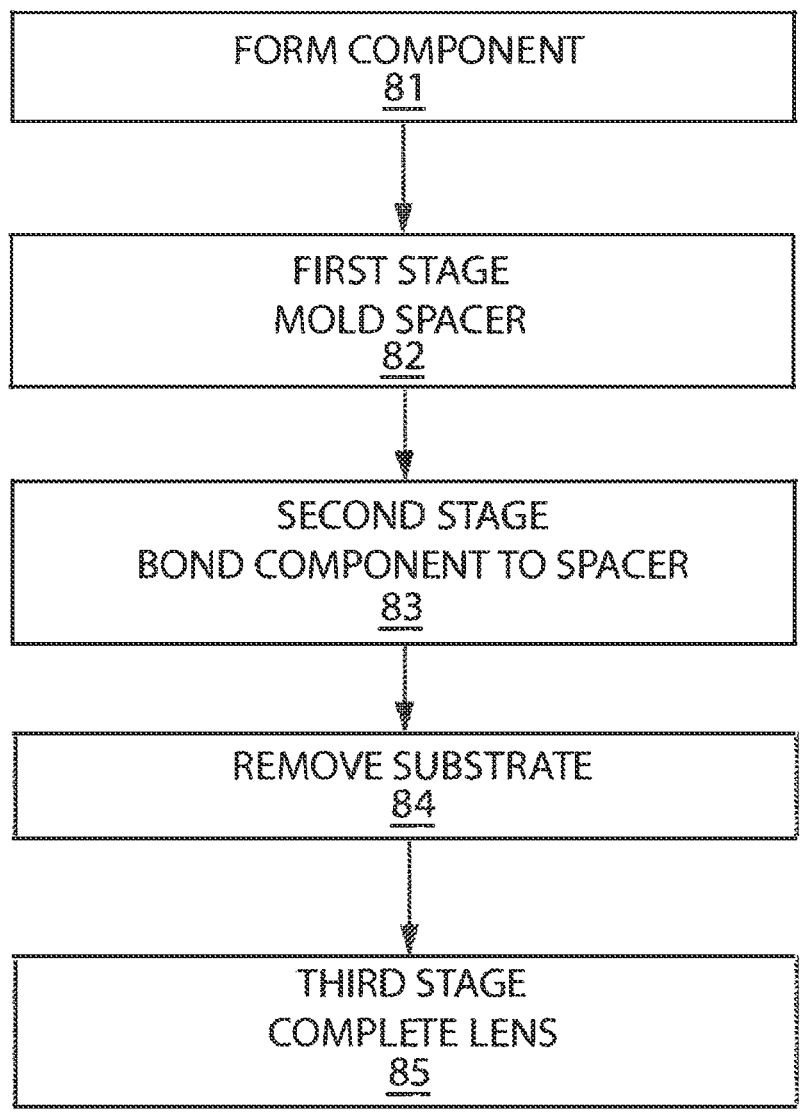
FIG. 8 is a flowchart of a multistage molding process for a contact lens according to selected embodiments of the current disclosure.

FIG. 8 is a flowchart of a multistage molding process for a contact lens according to selected embodiments of the current disclosure. The component or components are formed on a polymer substrate 81. This may include trimming the component(s) and substrate to a desired outer diameter. A spacer is molded to a male mold 82 during the first stage. While it is anticipated that the component is formed 81 before the spacer is molded to the male mold 82, it is nonetheless possible and to mold the spacer to the male mold 82 before forming the component(s) on the polymer substrate 81. In either event, the second stage of the molding process includes bonding the components to the spacer 83. After bonding the components to the spacer 83, the polymer substrate is removed 84. Finally, in the third (or subsequent) stage, the lens is completed by providing additional lens material to form the final shape of the lens 85. While the step of forming the final shape of the lens may be done in a single stage, it is also possible that the final shape of the lens is formed using one or more additional lens materials over multiple steps or stages.

According to certain embodiments disclosed herein, the inserts are rigid, relatively inflexible molds. However, alternative embodiments of the current disclosure include soft, flexible molds. The use of soft, relatively flexible molds may be used to adapt to non-spherical male molds, such as those used to create lenses with cylinder power, as well as to potentially allow for a more effective de-molding operation.

For example, two methods are possible when removing the molded material: direct axial separation and edge lifted separation. Direct axial methods are harder to execute because they require the entire mold to open simultaneously, which often results in a suction effect. The suction effect may be detrimental to allowing the cast material to remain on the base mold surface. Edge lifting methods are similar, but are gentler as they allow for one side to open and relieve suction while the balance of the mold remains attached. Additional rotation of the insert results in more detachment from the cast material in a progressive peel separation. However, an edge lifting method still imparts a fairly high suction lifting force until the inception of the seal break to relieve the suction, and continues to add high risk during mold opening.

With a soft insert, the suction zone can be reduced or nearly eliminated by local deformation of the insert right at the edge of the cast material to force the seal to break and initiate the peel process for mold opening. Subsequent peeling of the soft insert continues to advance the peel zone as it progresses across the cast material without imparting a suction force on the balance of the cast material that is not yet exposed.

Certain methods of the current disclosure promote adhesion to specific mold surfaces to gain advantages during de-molding. One such method intentionally interferes with polymerization on one surface, while not interfering or even enhancing the polymerization on alternate mold surface(s).

The most common methods of manipulating preferential adhesion include methods of surface modification to increase or decrease bond surface adhesion. In some cases, the surface modification is a plasma energy activation mechanism, and in other cases it involves the pre-application of primers (promotion) or release agents (interference) to a mold surface to alter the strength of the bond between the mold surface and fully polymerized material being cured.

Another possible method may be implemented where a specific alteration mechanism on the surface of the mold is applied to interfere with polymerization at the surface to a controlled depth into the cast material. The results of this cure inhibition could be to either increase adhesion or decrease adhesion at that boundary such that cast material would remain connected to a desired mold surface. A further benefit of this method would be enhanced adhesion of the subsequent layer at this inhibited boundary. As a result of not fully polymerizing, there are partially completed polymer chains that are at the surface waiting for more monomer and activator to complete the polymerization. When a subsequent layer is applied and cured, the inhibited zone is properly finalized (polymerized) by exposure to newly delivered activator to overcome the deactivated activator from the prior round of cure.

Certain embodiments of the current disclosure describe the lens to be built from back to front, as shown in FIGS. 1-5. Nonetheless, as will be appreciated by those skilled in the art after reading this disclosure, alternative embodiments of the current disclosure include building the lens from front to back. In other words, the molding process may be inverted such that the first stage is on the female mold, and the insert(s) are designed to mate or seal to the female mold.

The apparatuses and methods disclosed herein include embedding components that are to be placed at a desired distance form a finished lens surface, for example, the anterior or posterior surface of a finished lens. Moreover, the instant disclosure should not be limited to uses of components having a polymer layer that is removed after being cast or adhered to a lens material. Certain components that are to be embedded within a contact lens may not have any layers that are to be removed during the fabrication process. For example, the step(s) described in FIG. 4 may be omitted, where the device 20 is not affixed to a polymer substrate 15 when bonded to the PDMS spacer as shown in FIG. 3. Accordingly, while the methods described herein may allow for the removal of a layer from the component during the fabrication process, such step may not be necessary in particular embodiments.

Components are shown placed in the geometric center of the male or female mold. However, displacement of the components from the geometric center is possible, and may in some instances be desirable. Certain embodiments displace the insert from the center of the mold to which it is applied. In other embodiments, the component may be displaced in a second stage on an otherwise geometric centered first stage cured material. For example, methods according to selected embodiments of the current disclosure either displace the insert of the first stage and second stage to achieve a displaced component; or, center the first stage and displace the component when it is placed on the cured first stage. Such methods may be used to achieve a displaced or de-centered component relative to the geometric center of the molds and/or resulting finished lens. Additionally, the wave washer may be rotationally asymmetric to allow for the decentration of the insert and resultant spacer.

Certain embodiments of the current disclosure include polydimethylsiloxane, however, other materials may be implemented for other embodiments, such as low expansion silicone hydrogels or low expansion hydrogels.

While various embodiments of the present invention have been described above, it should be understood that they have been presented by way of example only, and not of limitation. Likewise, the various diagrams may depict an example architectural or other configuration for the invention, which is provided to aid in understanding the features and functionality that can be included in the invention. The invention is not restricted to the illustrated example architectures or configurations, but the desired features can be implemented using a variety of alternative architectures and configurations.

Indeed, it will be apparent to one of skill in the art how alternative functional configurations can be implemented to implement the desired features of the present invention. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

What is claimed is:

1. An apparatus for molding a contact lens, the apparatus comprising:
a housing;
at least one female mold insert having a female molding surface and a back surface opposite the female molding surface;
a male mold having a male molding surface; and
a compression spring or a wave washer, wherein the compression spring or the wave washer resides between the back surface of the at least one female mold insert and the housing;
wherein the male molding surface of the male mold mates with the female molding surface of the at least one female mold insert while the at least one female mold insert resides within the housing.

2. The apparatus of claim 1, wherein the at least one female mold insert is soft, flexible, or deformable.

3. The apparatus of claim 1, wherein the at least one female mold insert is rigid.

4. The apparatus of claim 1, wherein the at least one female mold insert is a first female mold insert, the apparatus further comprising:
a second female mold insert;
wherein the male mold mates with the second female mold insert while the second female mold insert resides within the housing.

5. The apparatus of claim 4, wherein:
the first female mold insert is soft, flexible, or deformable; and
the second female mold insert is soft, flexible, or deformable.

6. The apparatus of claim 4, wherein:
the first female mold insert is soft, flexible, or deformable; and
the second female mold insert is rigid.

7. The apparatus of claim 4, wherein:
the first female mold insert is rigid; and
the second female mold insert is rigid.

8. The apparatus of claim 4:
wherein the first female mold insert and second female mold insert each have an inner diameter; and
wherein the inner diameter of the first female mold insert is less than the inner diameter of the second female mold insert.

9. The apparatus of claim 1, wherein the housing is a first housing and the at least one female mold insert is a first female mold insert, the apparatus further comprising:
a second housing; and
a second female mold insert;
wherein the male mold mates with the first female mold insert while the first female mold insert resides within the first housing; and wherein the male mold mates with the second female mold insert while the second female mold insert resides within the second housing.

10. The apparatus of claim 9, wherein:
the first female mold insert is soft, flexible, or deformable; and
the second female mold insert is soft, flexible, or deformable.

11. The apparatus of claim 9, wherein:
the first female mold insert is soft, flexible, or deformable; and
the second female mold insert is rigid.

12. The apparatus of claim 9, wherein:
the first female mold insert is rigid; and
the second female mold insert is rigid.

13. The apparatus of claim 9:
wherein the first female mold insert and second female mold insert each have an inner diameter; and
wherein the inner diameter of the first female mold insert is less than the inner diameter of the second female mold insert.

\* \* \* \* \*